(12) United States Patent
Zhong et al.

(10) Patent No.: US 8,783,165 B2
(45) Date of Patent: Jul. 22, 2014

(54) STRUCTURE OF A COFFEE MAKER

(75) Inventors: Weijun Zhong, Zhangzhou (CN); Ming Chuan Yu, Taipei (TW)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 0 days.

(21) Appl. No.: 13/563,589

(22) Filed: Jul. 31, 2012

(65) Prior Publication Data

US 2013/0032037 A1    Feb. 7, 2013

(30) Foreign Application Priority Data

Aug. 3, 2011   (CN) ...................... 2011 2 0283546 U

(51) Int. Cl.
  *A47J 31/057*    (2006.01)
(52) U.S. Cl.
  USPC ............................................. 99/300; 99/283
(58) Field of Classification Search
  CPC .......... A47J 31/00; A47J 31/057; A47J 31/46
  USPC ............ 99/302 R, 283, 298, 295, 302 P, 308, 99/309, 300, 291, 290, 282, 299, 305, 310, 99/311, 312, 288, 281; 251/7, 11, 62, 324, 251/332, 129.01; 137/14, 511
  See application file for complete search history.

(56) References Cited

U.S. PATENT DOCUMENTS

| | | | |
|---|---|---|---|
| 6,382,083 B2 * | 5/2002 | Schmed | ...................... 99/289 R |
| 7,219,599 B2 * | 5/2007 | Geiger | ............................ 99/299 |
| 2009/0136639 A1 * | 5/2009 | Doglioni Majer | ............ 426/431 |

* cited by examiner

*Primary Examiner* — Henry Yuen
*Assistant Examiner* — Phuong Nguyen
(74) *Attorney, Agent, or Firm* — Rabin & Berdo, P.C.

(57) ABSTRACT

A structure of universal coffee maker comprising a water tank, a water pump, a heating element and an extractor, which is provided with at least one one-way water way communicating with the above components in turn, wherein said water pump is connected to a controller which can set the pumping power of the water pump. Different pumping power can be set by the water pump with controller to get different water pressure, so that the pressure conditions of different kinds of universal coffee maker can be satisfied.

1 Claim, 2 Drawing Sheets

STRUCTURE OF A COFFEE MAKER

FIELD OF THE INVENTION

The present invention relates to a structure of coffee maker, and more particularly to a structure of universal coffee maker.

BACKGROUND OF THE INVENTION

The traditional coffee cooking process is: coffee bean is grinded to coffee powder, and then the coffee power is filled in the extractor, and then the extractor is communicated with the hot water in the waterway to complete the extracting process, and then the coffee liquid is obtained. According to the procedure above, a plurality of uncertain factors are present during the filling process of the coffee powder to affect the filling density and shape, and the extracting conditions will be affected during the hot water flowing process, so that it is difficult to gain the coffee liquid with consistent taste, and it is too difficult or expensive to achieve accurate consistency whether by artificial filling or the automatic filling of full-automatic coffee maker.

Because of the factors above, the aim of morbid café is to control the coffee extracting environment to reduce the uncertain factor, such as powder shape, filling pressure, water permeability path and so on, the coffee powder is encapsulated in a relative closed heatproof container with inert gas and micro components such as filtering pressure device and reactor according to weight for optimizing the extracting environment; during the using process, the hot water of the coffee maker directly penetrates the capsule, and the extracting conditions in the capsule can be ensured through certain pressure, and then the consistency of the coffee taste can be controlled through the controllable craft in factory. Of course, in another hand, the shape of the morbid café can ensure the freshmen of the coffee power by filling with the inert gas, and it can extends the length for preservation of the grinded coffee powder; meanwhile, because of the coffee powder sealing in the capsule, the cleaning and maintaining time for the coffee maker is less needed. This shows that the morbid café and its assorted coffee maker brings great convenience for all kinds of retailers, home and personals.

A lot of coffee makers, such as NESPRESSOS™, are present in the market with different brands and specifications, and fitting morbid cafés all have their own characteristics, so that different morbid cafes cannot fit to different coffeemakers that may be sold under the trademark NESPRESSOS™, the cooking conditions of the morbid cafes are different with obviously gap, especially on the demands of the water pressure. So it is necessarily needed to design a universal coffeemaker that may be sold under the trademark NESPRESSOS™.

SUMMARY OF THE INVENTION

According to the demands above, a structure of universal coffeemaker that may be sold under the trademark NESPRESSOS™ is present in the present invention, and the technical proposal is:

A structure of universal coffeemakers that may be sold under the trademark NESPRESSOS™ comprising:

A water tank, a water pump, a heating element and an extractor, which is provided with at least one one-way water way communicating with the above components in turn, wherein, the water pump is connected to a controller which can set the pumping power of the water pump.

As the preferred embodiments of the present invention, improvements can be made in the following aspects:

In a preferred embodiment, the waterway of inlet end of the extractor is provided with a pressure-keeping mechanism for regulating water pressure.

In a preferred embodiment, the pressure-keeping mechanism comprises:

A pressure-keeping seat with axial through hole;

A chuck plug, which is provided with coupling surface coupling with one side of the through hole of the pressure-keeping seat and blocking the through hole;

And an accumulating spring, of which one end is fixed to the chuck plug and another end is fixed to the pressure-keeping mechanism;

Wherein, the pressure-keeping seat, the chuck plug and the spring are placed in turn along the direction of the waterway.

The advantages of the present invention are:

1 Different pumping power can be set by the water pump with controller to get different water pressure, so that the pressure conditions of different kinds of universal coffeemaker that may be sold under the trademark NESPRESSOS™ can be satisfied.

2 More accurate water pressure control can be achieved by the waterway with pressure-keeping mechanism coupling with the water pump with controller.

3 the structure of the pressure-keeping mechanism containing pressure-keeping seat, the chuck plug and the accumulating spring is simple and reliable.

BRIEF DESCRIPTION OF THE DRAWINGS

With the following description of the drawings and specific embodiments, the invention shall be further described in details.

DESCRIPTION OF THE PREFERRED EMBODIMENTS

Figure 1:
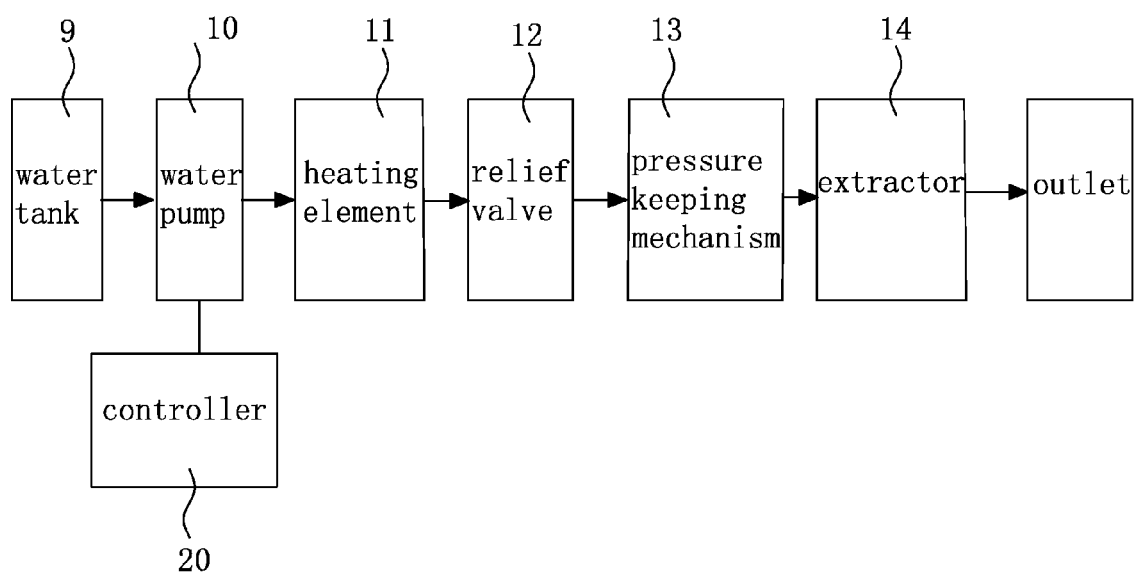
FIG. 1 shows the structure block diagram of the embodiment in the present invention.

In FIG. 1, the structure block diagram of the embodiment in the present invention is present; the short line with arrow in this figure represents the waterway connection and its direction; the water tank 9 is used for storing the cold water used for cooking coffee, the water pump 10 runs with certain output power under the seating of the controller 20, so that the cold water entering the heating element 11 is provided with certain pressure, and the heating element is a boiler, and the pre-stage of the heating element is provided with a relief valve 12.

The water coming from the water tank 9 is pumped and pressured into the heating element 11 through the water pump 10, so that the water in the heating element 11 gets to the extractor through the relief valve 12 and the pressure-keeping mechanism 13 under the pressure. The pressure-keeping mechanism 13 is a mechanism with valve and located in the waterway of the inlet end of the extractor 14, of which the principles is: the pressure in the waterway is controlled, and the waterway is communicated when the pressure gets to the threshold, and the pressure used for extracting the morbido café is controlled more accurately, so that the suitable taste of the coffee extract liquor is guaranteed. Because the extracting condition of the morbid café is restrained by its packaging material and craft, the quality of the extracting coffee is relatively controlled by just ensuring the outer water temperature and pressure.

The controller 20 can control the running of the water pump 10 through the single chip control system to achieve the accuracy of the pumping power of the water pump 10, and the stability of the water pressure is guaranteed. Furthermore, because of the pressure-keeping mechanism 13, the waterway to which the pressure is granted from the water pump 10 can get pressure control more accurately, and at last the condition can fit the cooking condition of the morbid café. During the actual using process, the circuit board of the controller 20 can be hidden in the shell of the coffeemaker, that may be sold under the trademark NESPRESSOS™, with low space occupation, so that it is easy to set the parameter according to different morbid café in one coffeemaker, that may be sold under the trademark NESPRESSOS™, and then the relatively generality is achieved.

Figure 2:
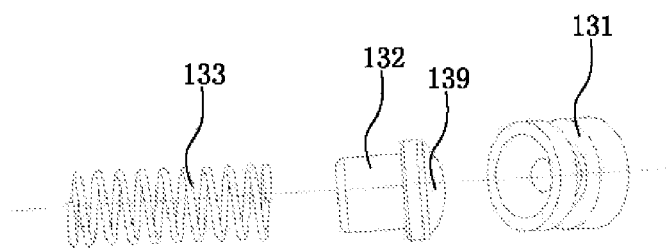
FIG. 2 shows the exploded view of the main components of the pressure-keeping mechanism of the embodiment in FIG. 1.
Figure 3:
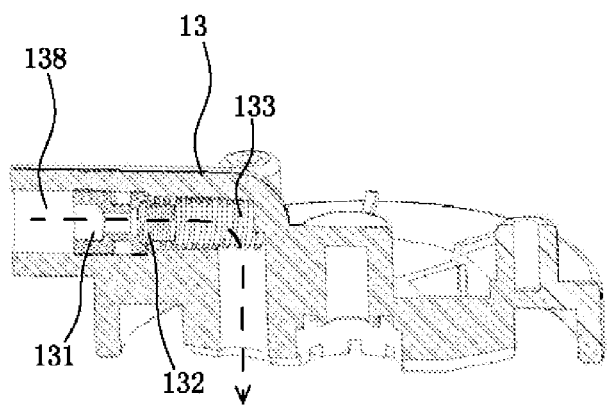
FIG. 3 shows the fundamental diagram of the pressure-keeping mechanism containing waterway of the embodiment in FIG. 1.

FIG. 2 shows the exploded view of the main components of the pressure-keeping mechanism of the embodiment in FIG. 1; FIG. 3 shows the fundamental diagram of the pressure-keeping mechanism containing waterway of the embodiment in FIG. 1. according to FIG. 2 and FIG. 3, one end of a accumulating spring 133 is fixed to the pressure-keeping mechanism 13 and squeezes the chuck plug 132, and then the chuck plug 132 is coupled with one side of the through hole of the pressure-keeping seat through the coupling surface 139, so that the chuck plug 132 can entirely block the pressure-keeping seat; the pressure-keeping seat 131, the chuck plug 132 and the accumulating spring 133 are all located in the waterway 138 of the inlet end of the extractor, and the dotted line with arrow shows the flowing direction of the waterway 138. The hot water from the waterway 138 gets to the chuck plug 132 through the through hole of the pressure-keeping seat 131; unless the water pressure in the waterway 138 exceeds the pressure that the chuck plug 132 against the pressure-keeping seat 131, the waterway that the dotted line with arrow shows will be blocked at the pressure-keeping seat 131, the demands for cooking the coffee with normal pressure are fulfilled through setting the position of the pressure-keeping seat 131 in the waterway 138; in this way, the water pressure in the waterway 138 can be guaranteed more accurately with relative generality for different morbid cafés; the structure of the pressure-keeping mechanism in the present structure is simple with good effect and reliability.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

What is claimed is:

1. A coffeemaker comprising:
   a water tank;
   a water pump;
   a heating element having a relief valve;
   an extractor;
   at least one one-way waterway communicating with each of the water tank, the water pump, the relief valve of the heating element and the extractor in turn;
   a controller having a single chip control system that is configured to control a running of the water pump so as to control a pumping power of the water pump; and
   a pressure-keeping mechanism provided in the at least one one-way waterway so as to be at an inlet end of the extractor, the pressure-keeping mechanism being provided for regulating water pressure, said pressure-keeping mechanism including:
      a pressure-keeping seat with an axial through hole,
      a chuck plug provided with a coupling surface that is coupleable with one side of the through hole of the pressure-keeping seat and being movable to a position to completely block the through hole, and
      an accumulating spring having one end fixed to the chuck plug and another end fixed to another part of the pressure-keeping mechanism,
   wherein the pressure-keeping seat, the chuck plug and the spring are placed in turn along a direction of the at least one waterway.

* * * * *